United States Patent [19]

Enami et al.

[11] Patent Number: 4,811,140
[45] Date of Patent: Mar. 7, 1989

[54] MAGNETIC DATA TRANSFER APPARATUS HAVING IMPROVED TRANSDUCER COIL ARRANGEMENT

[75] Inventors: Katsuya Enami, Tachikawa; Sinobu Kawamura, Tokyo; Fumio Nagase, Tama; Shinichi Aikawa, Mitaka, all of Japan

[73] Assignee: Teac Corporation, Tokyo, Japan

[21] Appl. No.: 139,066

[22] Filed: Dec. 21, 1987

Related U.S. Application Data

[63] Continuation of Ser. No. 767,650, Aug. 28, 1985, abandoned.

[30] Foreign Application Priority Data

Aug. 31, 1984 [JP] Japan .......................... 59-132186[U]

[51] Int. Cl.$^4$ ...................... G11B 5/48; G11B 21/16
[52] U.S. Cl. ...................... 360/104; 360/103; 360/118
[58] Field of Search ............... 360/118, 123, 104, 103, 360/102, 97, 99, 105, 129

[56] References Cited

U.S. PATENT DOCUMENTS

| 4,089,029 | 5/1978 | Castrodale et al. | |
|---|---|---|---|
| 4,176,384 | 11/1979 | Yang, II | 360/118 |
| 4,250,530 | 2/1981 | Yang | 360/103 X |
| 4,422,115 | 12/1983 | Spash | 360/104 |
| 4,432,027 | 2/1984 | Higuchi | 360/104 |
| 4,520,555 | 6/1985 | Gyi et al. | 360/129 |
| 4,542,429 | 1/1986 | Nishida et al. | 360/103 |
| 4,651,243 | 3/1987 | Daste et al. | 360/104 |
| 4,682,254 | 7/1987 | Hashimoto et al. | 360/104 |

FOREIGN PATENT DOCUMENTS

58-77080  5/1983  Japan .

Primary Examiner—Stuart N. Hecker
Assistant Examiner—David J. Severin
Attorney, Agent, or Firm—Woodcock Washburn Kurtz Mackiewicz & Norris

[57] ABSTRACT

An apparatus having a pair of magnetic transducer head assemblies for data transfer with both sides of a recording medium such as a flexible magnetic disk. One of the head assemblies is mounted via a planar flexure seat on a carriage movable radially of the medium, whereas the other head assembly is mounted via another planar flexure seat on a load arm which is hingedly mounted on the carriage for pivotal motion toward and away from the medium. At least one, preferably both, of the head assemblies has a data transfer coil such as a read/-write coil at least partly, preferably wholly, disposed on that side of the flexure seat which is directed toward the recording medium. An erase coil, if any, of each head assembly may also be disposed on the same side of the flexure seat. This coil arrangement affords a significant reduction in the thickness of the apparatus.

7 Claims, 3 Drawing Sheets

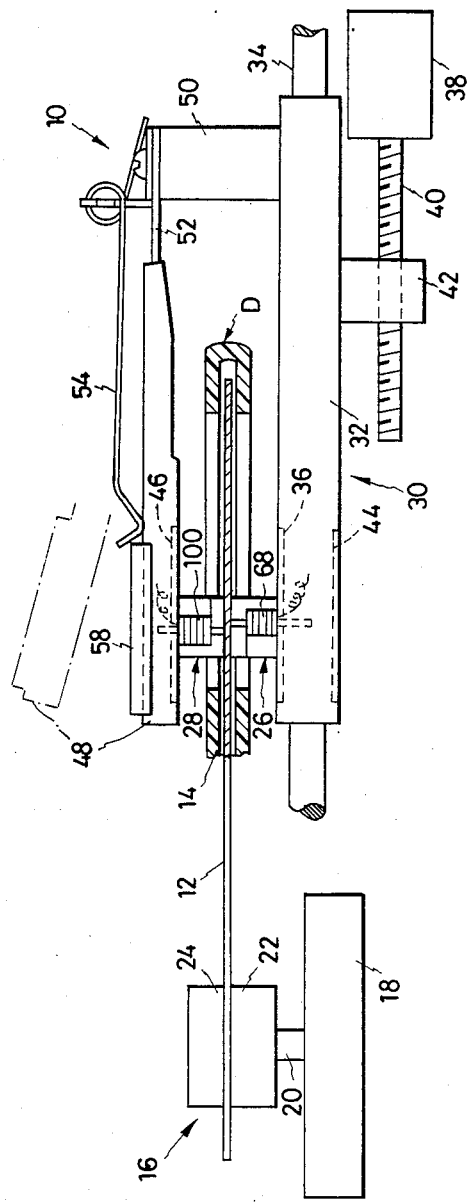
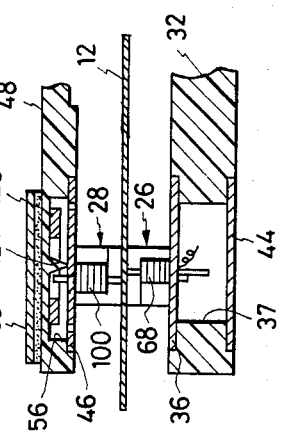

MAGNETIC DATA TRANSFER APPARATUS HAVING IMPROVED TRANSDUCER COIL ARRANGEMENT

This is a continuation of application Ser. No. 767,650, filed Aug. 28, 1985, now abandoned.

BACKGROUND OF THE INVENTION

Our invention relates to an apparatus for reading and/or writing information with magnetic recording media such as, typically, a flexible magnetic disk now generally referred to as a floppy disk. More particularly, our invention pertains to such a magnetic data transfer apparatus, or a floppy disk drive according to common parlance, having one or two magnetic transducer head assemblies of improved coil arrangement with respect to their supporting means.

A typical prior art floppy disk drive comparable to that of our present invention is disclosed in Noda U.S. patent application Ser. No. 434,400 (corresponding to Japanese Laid Open Patent Application No. 58-77080 dated May 10, 1983) filed Oct. 14, 1982 and assigned to the assignee of the instant application, now U.S. Pat. No. 4,602,306. Intended for use with a double sided floppy disk, that known disk drive has a pair of magnetic transducer head assemblies, one mounted directly on a carriage movable radially of the floppy disk, and the other mounted on a load arm pivoted on the carriage. This prior application also suggests the mounting of the head assemblies on the carriage and the load arm via respective flexure seats but contains no teaching whatever as to the arrangement of the coils included in the head assemblies.

As far as we are aware, however, Castrodale et al. U.S. Pat. No. 4,089,029 reflects typical conventional transducer coil arrangement. According to this patent the transducer coils are disposed on the magnetic core portions protruding on those sides of the flexure seats which are directed away from the floppy disk. The known constructions of the head assemblies have necessitated this coil arrangement for the ease of their assemblage and mounting.

The gapped surfaces of the head assemblies must be disposed a sufficient distance away from their flexure seats to avoid contact of the floppy disk, which is subject to wobbling motion during rotation, with the head carrying means. Accordingly, the conventional arrangement of the coils on those sides of the head seats away from the disk makes still greater the dimensions of the magnetic cores in a direction perpendicular to the disk, necessitating a corresponding increase in the dimension of the complete disk drive in the same direction. We also object to such elongate magnetic cores because of unnecessarily great magnetic losses and, in consequence, of low data transducing efficiencies.

SUMMARY OF THE INVENTION

We have hereby discovered how to arrange the coil or coils of a magnetic transducer head assembly or assemblies in a magnetic data transfer apparatus of the type defined, so as to reduce the thickness of the apparatus and to realize a higher transducing efficiency for the head assembly or assemblies.

Our invention may be broadly summarized as an apparatus for data transfer with a magnetic recording medium, comprising a drive mechanism for imparting rotation to the recording medium in a preassigned data transfer position, and carriage means movable radially of the recording medium being held in the data transfer position. At least one magnetic transducer head assembly is mounted on the carriage means via a substantially planar flexure seat for data transfer with the recording medium. The flexure seat is substantially in parallel spaced relation to the recording medium at least during data transfer. The head assembly has a data transfer coil (e.g. a read/write coil) mounted to an associated magnetic core and at least partly, preferably wholly, disposed on that side of the flexure seat which is directed toward the recording medium.

A preferred embodiment of our invention disclosed herein employs two magnetic transducer head assemblies, one mounted on a carriage via a flexure seat and the other mounted via another flexure seat on a load arm pivoted on the carriage. Both head assemblies have their coils wholly disposed on those sides of the flexure seats which are directed toward the intervening recording medium. If the head assemblies have additional coils, such as tunnel erase coils, then these coils may also be disposed on the same sides of the flexure seats as the data transfer coils.

Thus, as the coils are partly or wholly disposed on the above specified sides of the flexure seats, the magnetic cores carrying the coils can be significantly reduced in their dimensions normal to the recording medium. The dimension of the data transfer apparatus in the same direction may therefore be made less than theretofore, and the magnetic losses of such reduced size cores will also be reduced.

The above and other features and advantages of our invention and the manner of realizing them will become more apparent, and the invention itself will best be understood, from a study of the following description and appended claims, with reference had to the attached drawings showing the preferred embodiment of our invention.

BRIEF DESCRIPTION OF THE DRAWINGS

FIG. 1 is a fragmentary diagrammatic elevation of the data transfer apparatus constructed in accordance with our invention, shown together with a double sided flexible magnetic disk having an envelope shown in section for the clarity of illustration;

FIG. 2 is a fragmentary vertical section through the pair of magnetic transducer head assemblies and neighboring parts of the data transfer apparatus of FIG. 1;

DESCRIPTION OF THE PREFERRED EMBODIMENT

Figure 3:
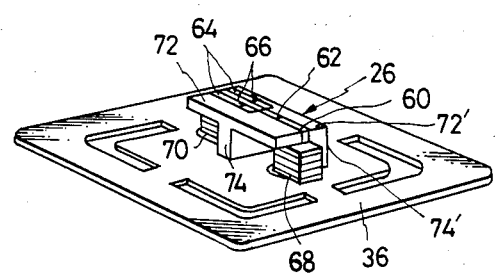
FIG. 3 is an enlarged perspective view of the lower head assembly and its flexure seat in the data transfer apparatus of FIG. 1.

We have illustrated in FIG. 1 the data transfer apparatus of our invention as adapted for use with a double sided flexible magnetic disk cartridge D. Generally designated 10, the data transfer apparatus is shown with the disk cartridge D mounted in a preassigned data transfer position therein. The disk cartridge D is of the familiar design having a double sided flexible magnetic disk 12 rotatably housed in a generally flat, rectangular, apertured, protective envelope 14 herein shown fragmentarily to facilitate illustration.

The reference numeral 16 generally denotes a disk drive mechanism for imparting rotation to the magnetic disk 12 in the data transfer position within the apparatus 10. Although we have shown the disk drive mechanism 16 very diagrammatically because of its conventional nature, it will nevertheless be seen that the disk drive mechanism includes an electric disk drive motor 18. Extending upwardly from the disk drive motor 18, an output shaft 20 has a drive hub 22 nonrotatably mounted thereon. A clamp 24 is disposed over the drive hub 22 and coacts therewith to engage the exposed central portion of the magnetic disk 12. The clamp 24 is not only movable into and out of engagement with the drive hub 22 via the intervening magnetic disk but also rotatable with the drive hub when engaged therewith via the magnetic disk. The joint rotation of the interfitting drive hub 22 and clamp 24 results, of course, in the revolution of the magnetic disk 12 frictionally captured therebetween, with respect to the protective envelope 14. The clamp 24 is to be moved out of engagement with the drive hub 22 for the loading and unloading of the disk cartridge D into and out of the apparatus 10 along a plane at right angles with the axis of the disk drive motor 18.

Since the data transfer apparatus 10 is intended for use with the double sided magnetic disk 12, we provide two magnetic transducer head assemblies 26 and 28 on the opposite sides of the disk cartridge D being held in the data transfer position. The head assemblies 26 and 28 are in register with each other, only with a slight offset in their gap positions to avoid flux interaction.

Generally labeled 30 in FIG. 1 is a head transport mechanism for transporting the head assemblies 26 and 28 radially of the magnetic disk 12 so as to enable the head assemblies to access the individual tracks on both sides of the disk. The head transport mechanism 30 includes a carriage 32 slidable along a pair of guide rods 34, one seen, in a radial direction of the magnetic disk 12. The first or lower head assembly 26 is mounted on this carriage 32, which can be a plastic molding, via a metal made, generally planar flexure seat 36, as shown also in FIG. 2 in a vertical section through the carriage. The flexure seat 36 is peripherally supported on an enlarged top edge of an aperture 37 defined vertically, or in a direction perpendicular to the magnetic disk 12, through the carriage 32. Employed for the linear travel of the carriage 32 along the guide rod pair 34, and also included in the head transport mechanism 30, is a head transport motor 38 of the electrical stepping type coupled directly to a lead screw 40 extending parallel to the guide rod pair 34. A nut 42 is fitted over the lead screw 40 and is affixed to the carriage 32, so that the incremental rotation of the head transport motor 38 results in the stepwise travel of the carriage along the guide rod pair 34. Shown as a flat plate of Permalloy (trademark) or like material, an electromagnetic shield 44 for the lower head assembly 26 is also mounted to the carriage 32, by being engaged in an enlarged bottom end of its aperture 37, in parallel spaced relation to the flexure seat 36 and on its side away from the magnetic disk 12.

With reference directed further to FIGS. 1 and 2 the second or upper transducer head assembly 28 is mounted via another metal made, generally planar flexure seat 46 on a distal end of a load arm 48 in the form of a plastic molding. The load arm 48 is proximally hinged to a column 50 on the carriage 32 via a cantilevered leaf spring 52 for pivotal motion between the solid line and phantom positions of FIG. 1. Thus the upper head assembly 28 travels jointly with the lower head assembly 26 in a radial direction of the magnetic disk 12 being held in the data transfer position. The cantilever spring 52 biases the load arm 48 from its phantom to solid line position.

Preferably, a torsional load spring 54 may be additionally provided for acting on the load arm 48 so as to load the upper head assembly 28 against the lower head assembly 26 via the intervening magnetic disk 12 for the establishment of proper data transfer contact of both head assemblies with the disk. Normally, however, or when the disk carriage D is not loaded in the apparatus 10, the load arm 48 is maintained in the phantom position by a standard head control mechanism, not show, against the forces of both springs 52 and 54.

As clearly shown in FIG. 2, the flexure seat 46 for the upper transducer head assembly 28 is peripherally engaged with an enlarged bottom edge of a depression 56 defined in the load arm 48. An electromagnetic shield 58 for the upper head assembly 28, which shield is in the form of a flat plate of Permalloy or like material, is affixed to the top of the load arm 48 in parallel spaced relation to the flexure seat 46 and on its side away from the upper head assembly 28.

We will now proceed to a more detailed discussion of the transducer head assemblies 26 and 28 and of their flexure seats 36 and 46. In giving such a detailed discussion we will assume, by way of example only, that the head assemblies 26 and 28 are both read/write transducers, each additionally equipped for a tunnel erase function.

Figure 4:
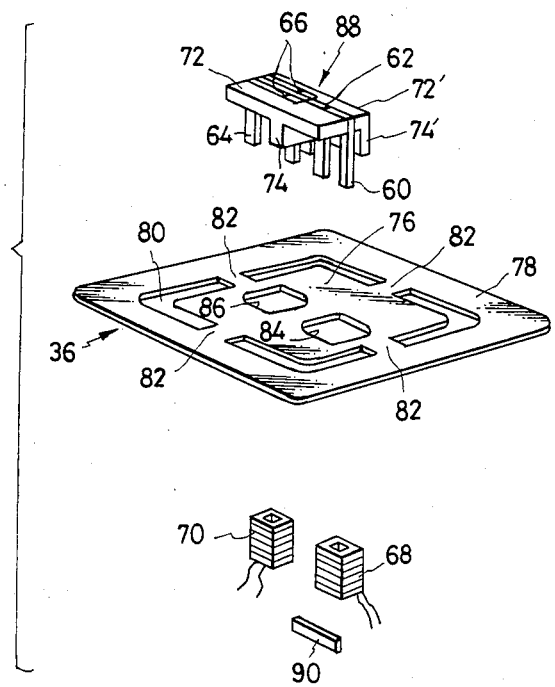
FIG. 4 is an exploded perspective view of the lower head assembly and flexure seat of FIG. 3.

FIGS. 3 and 4 illustrates the lower transducer head assembly 26 and its flexure seat 36 in assembled and disassembled forms, respectively. As will be observed from these figures, the lower head assembly 26 comprises a read/write core 60 of magnetic material having a read/write gap 62 defined in its surface directed opposite the magnetic disk 12, and a pair of tunnel erase cores 64 of magnetic material spaced from each other in a tangential direction of the tracks on the magnetic disk and each having an erase gap 66 defined in its surface directed opposite the magnetic disk. The read/write core 60 has a read/write coil 68 wound or sleeved on one of its two legs extending from the gapped surface of the core in a direction away from the magnetic disk 12. The pair of tunnel erase cores 64 have a common erase coil 70 wound around one of the two legs of each erase core. The lower head assembly 26 is further provided with a pair of outriggers 72 and 72' of ceramic or like nonmagnetic material integrally secured to the opposite sides of the cores 60 and 64. These outriggers 72 and 72' serve the purposes of reinforcing and firmly holding the cores 60 and 64 and of affording the data transfer contact of the head assembly 26 with the magnetic disk 12 with a minimum of frictional resistance.

In accordance with a feature of our invention, as will be observed also from FIG. 2, the read/write coil 68 and tunnel erase coil 70 are both disposed on the upper side of the flexure seat 36, that is, on that side of the flexure seat which is directed toward the magnetic disk 12 being held in the data transfer position. The pair of outriggers 72 and 72' are formed to include spacer portions 74 and 74', respectively, depending therefrom into abutment against the flexure seat 36 for holding the gapped surfaces of the cores 60 and 64 a required distance away from the flexure seat and for providing spaces for accommodating the coils 68 and 70 above the flexure seat. The coils 68 and 70 are both substantially wholly disposed on the upper side of the flexure seat 36 in this particular embodiment; in practice, however, they may partly protrude toward the lower side of the flexure seat without departing from the scope of our invention. Thus, in the improved data transfer apparatus 10 of our invention, the cores 60 and 64 extend into the lower side of the flexure seat 36 only to a minimal extent. This arrangement of the coils 68 and 70, and therefore of the cores 60 and 64 and outriggers 72 and 72' as well, with respect to the flexure seat 36 in accordance with our invention is in clear contrast to the prior art wherein the coils have been disposed under the flexure seat.

With particular reference to FIG. 4 the flexure seat 36 for the lower head assembly 26 is in the form of a rectangular piece of sheet metal, comprising a rectangular central portion 76 and, around this portion, a marginal edge portion 78. These portions 76 and 78 are divided from each other by an aperture 80 of rectangular arrangement, with four bridges 82 across the aperture for joining the portions 76 and 78. The central portion 76, having two openings 84 and 86 formed therein, is intended for bearing the lower head assembly 26 thereon, whereas the marginal edge portion 78 is intended to be secured to the carriage 32. The lower head assembly 26 is therefore resiliently displaceable relative to the carriage 32 in a direction normal to the magnetic disk 12.

The following is the description of the procedure through which the lower head assembly 26 and its flexure seat 36 may be assembled. There may first be prepared an assembly 88, FIG. 4, of the read/write core 60, pair of erase cores 64, and pair of outriggers 72, all integrally bonded to one another. Then the preformed erase coil 70 may be fitted over the required leg portions of the erase cores 64. Then the core and outrigger assembly 88, together with the erase coil 70 mounted thereto, may be placed in position on the central portion 76 of the flexure seat 36, with the depending spacer portion 74 and 74' of the outriggers 72 and 72' butting on the flexure seat, and with the extreme end portions of the erase cores 64 and the leads of the erase coil 70 protruding downwardly of the flexure seat through its opening 86. The extreme end portions of the read/write core 60 also protrude downwardly of the flexure seat 36 through the other opening 84 in its central portion 76. So positioned, the core and outrigger assembly 88 may have the spacer portions 74 and 74' of its outriggers 72 and 72' bonded to the flexure seat 36.

Then the read/write coil 68 may be inserted upwardly into and through the opening 84 in the flexure seat 84, into engagement over one of the two leg portions of the read/write core 60. Then the read/write coil 68 and erase coil 70 may both be bonded to the core and outrigger assembly 88. Then, under the flexure seat 36, a sidebar 90 (FIG. 4) may be bonded to the extreme ends of the leg portions of the read/write core 60 so as to provide a low reluctance flux path therethrough.

Then the leads of the read/write coil 68 and erase coil 70, extending downwardly of the flexure seat 36 through its openings 84 and 86 as aforesaid, may be soldered to the leads, not shown, of required data processing circuitry. Then these coil leads may be secured to the flexure seat 36 after coating them with a suitable resin material by way of protection. The ends of the coils 68 and 70 may also be affixed to the flexure seat 36. We have now completed the assemblage of the lower head assembly 26 in position on the flexure seat 36. This flexure seat may then be mounted on the carriage 32, FIGS. 1 and 2, by having its marginal edge portion 78 engaged in the enlarged top end of the aperture 37 in the carriage.

We recommend a copper base alloy, beryllium copper in particular, as a material for the flexure seat 36. Made of a beryllium copper seat having a resistivity of not more than $5 \times 10^{-8}$ ohm-meters and a thickness of approximately 80 microns, the flexure seat 36 will serve the purpose of magnetically shielding the head assembly 26, in addition to that of resiliently supporting same. The flexure seat 36 of this construction has a relatively low modulus of elasticity, approximately from 12 to $13 \times 10^{10}$ N/m².

As we have stated in conjunction with FIG. 4, the flexure seat 36 allow the lower head assembly 26 to resiliently displace, though to a relatively small extent, in a direction normal to the magnetic disk 12 but substantially locks the head assembly against displacement both in a radial direction of the magnetic disk and in a tangential direction of the disk tracks. In short the flexure seat 36 supports the lower head assembly 26 in a nongimbal fashion. The elastic modulus of the flexure seat 36 is relatively low as noted above. Accordingly, should this flexure seat be configured to support the lower head assembly 26 in a gimbal fashion, the head assembly would become susceptible to resonant vibration when its frictional resistance with the magnetic disk 12 is high. We have avoided such resonant vibration of the lower head assembly 26 by the nongimbal configuration of the flexure seat 36.

Since the read/write coil 58 of the lower head assembly 26 is wholly supported on the disk side of the flexure seat 36 in the illustrated embodiment, the flexure seat can very effectively shield the coil from electromagnetic waves on its lower side, Fabricated from beryllium copper of low resistivity, the flexure seat 36 will permit ready flow of eddy currents for shielding the lower head assembly 26.

Figure 5:
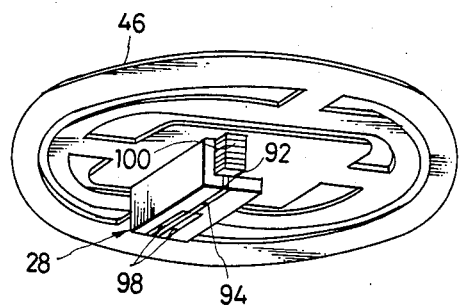
FIG. 5 is an enlarged perspective view of the upper head assembly and its flexure seat in the data transfer apparatus of FIG. 1.
Figure 6:
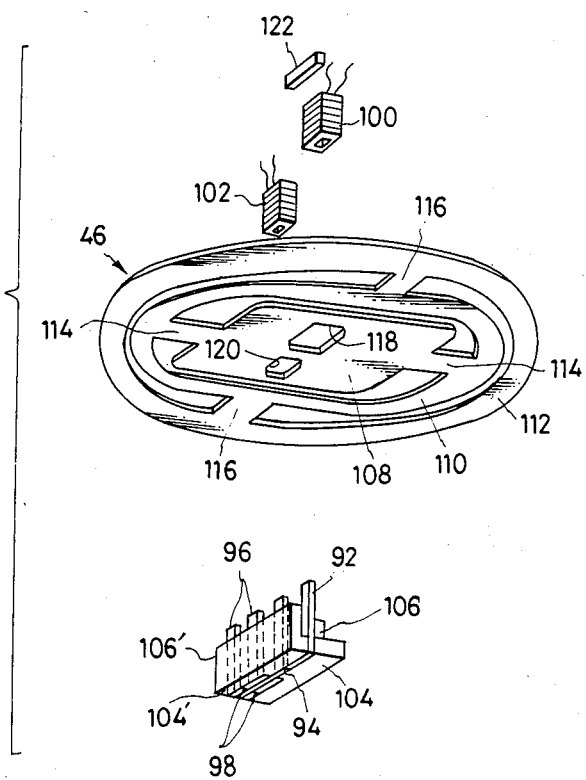
FIG. 6 is an exploded perspective view of the upper head assembly and flexure seat of FIG. 5.

FIGS. 5 and 6 are illustrations of the upper transducer head assembly 28 and its flexure seat 46 in assembled and disassembled forms, respectively. The upper head assembly 28 can be similar in construction to the lower head assembly 26, comprising a read/write core 92 of magnetic material disposed centrally and having a read/write gap 94 defined in its surface directed opposite the magnetic disk 12, and a pair of tunnel erase cores 96 of magnetic material spaced from each other in a tangential direction of the tracks on the magnetic disk and each having an erase gap 98 defined in its surface directed opposite the magnetic disk. The read/write core 92 has a read/write coil 100 wound or sleeved on one of its two legs extending upwardly, or in a direction away from the magnetic disk 12, from the gapped surface of the core. The pair of tunnel erase cores 96 have a common erase coil 102 wound around one of the two legs also extending upwardly from the gapped surface of each erase core. The upper head assembly 28 is further provided with a pair of outriggers 104 and 104' of ceramic or like nonmagnetic material integrally secured to the opposite sides of the cores 92 and 96. The outriggers 104 and 104' have spacer portions 106 and 106'.

As in the case of the lower head assembly 26, the upper head assembly 28 has its coils 100 and 102 disposed on the disk side of the flexure seat 46. The magnetic cores 92 and 96 protrude upwardly of the flexure seat 46 only to a minimal extent, so that the thickness of the load arm 48 can be made much less than heretofore.

Thus, in accordance with our invention, the coils 68 and 70 of the lower head assembly 26 and the coils 100 and 102 of the upper head assembly 28 are all disposed on the disk sides of the flexure seats 36 and 46 carrying the respective head assemblies. This improved coil arrangement makes it possible to reduce the vertical dimension from the bottom of the carriage 32 to the highest point of the load arm 48, when the latter is in the phantom position of FIG. 1, to approximately 48 millimeters. The same dimension in the comparable prior art construction, wherein the transducer coils have all been disposed on those sides of the flexure seats which are away from the magnetic disk, has been approximately 58 millimeters.

Unlike the flexure seat 36 for the lower head assembly 26, the flexure seat 46 for the upper head assembly 28 supports same in a gimbal fashion. The flexure seat 46 can take the form of a sheet metal punching, integrally comprising a rectangular central portion 108, a first annular portion 110 surrounding the central portion, and a second annular portion 112 surrounding the first annular portion, as indicated in FIG. 6. The central portion 108, on which the upper head assembly 28 is mounted, is joined to the first annular portion 110 via a pair of relatively slender bridges 114 arranged collinearly on the opposite sides of the central portion. The first annular portion 110 is joined in turn to the second annular portion 112 via another pair of relatively slender bridges 116 arranged collinearly on the opposite sides of the first annular portion and extending in right angular relation with the first pair of bridges 114. The central portion 108 of the flexure seat 46 has formed therein two openings 118 and 120 similar to the openings 84 and 86 in the central portion 76 of the flexure seat 36 for the lower head assembly 26. It is therefore self evident that the upper head assembly 28 can be assembled and mounted in position on the flexure seat 46 the same way as the lower head assembly 26 is assembled and mounted on the flexure seat 36, as has been described previously. A sidebar 122 bridging the leg portions of the read/write core 92, as well as the leads of the coils 100 and 102, are disposed above the flexure seat 46, also as has been set forth in conjunction with the lower head assembly 26.

The flexure seat 46 of the foregoing configuration is mounted to the load arm 48, FIGS. 1 and 2, by having its second annular portion 112 engaged in the enlarged end of the depression 56 in the load arm. FIG. 2 also illustrates a rigid pivot 124 formed integral with the load arm 48 on the bottom of the depression 56 to bear against the central portion 108 of the flexure seat 46. Consequently, mounted on the central portion 108 of the flexure seat 46, the upper head assembly 28 is pivotable on the pivot 124 about the two orthogonal axes along the respective pairs of bridges 114 and 116 of the flexure seat 46. The two orthogonal axes are of course parallel to the plane of the magnetic disk 12 when the load arm 48 is in the solid line working position of FIGS. 1 and 2, with one of the axes extending radially of the magnetic disk and the other axes extending tangentially of the tracks thereon.

The upper head assembly 28, gimbaled as above on the load arm 48, might vibrate by resonance during data transfer contact with the magnetic disk 12 if its flexure seat 46 were fabricated of beryllium copper or like material having a relatively small modulus of elasticity. We have precluded this possibility by fabricating the upper flexure seat 46 from steel, whose modulus of elasticity is approximately 1.6 times as high as the of beryllium copper of which the lower flexure seat 36 is made. The upper flexure seat 46 may be approximately 50 microns thick. The resonance frequency of the steel made flexure seat 46 becomes sufficiently high to prevent the vibration of the upper head assembly 48 at frequencies that would adversely affect its proper data transducer with the magnetic disk 12.

There is, however, one problem with the steel made flexure seat 46, that the resistivity of steel is approximately $20 \times 10^{-8}$ ohm-meter, which is higher than that of beryllium copper. Accordingly, this flexure seat hardly serves per se as a shield for the upper head assembly 28. We have therefore employed a shield ring 126 which, as illustrated in FIG. 2, is firmly bottomed against the depression 56 in the load arm 48 so as to overlie the upper head assembly 28. Made of, for example, a copper or aluminum base alloy with a resistivity of not more than $3 \times 10^{-8}$ ohm-meter, the shield ring 126 can effectively shield the upper head assembly 28.

In the operation of the data transfer apparatus 10 constructed as in the foregoing, the disk cartridge D may first be inserted therein to the data transfer position of FIG. 1, with the load arm 48 held in the phantom position against the forces of the springs 52 and 54. Then the load arm 48 may be caused to spring down to the solid line position of FIGS. 1 and 2 for the establishment of the data transfer contact of the magnetic disk 12 with both transducer head assemblies 26 and 28. The upper head assembly 28 will strike the lower head assembly 26 via the magnetic disk 12 upon pivotal motion of the load arm 48 from its phantom to solid line position. However, since the lower head assembly 26 is mounted on the flexure seat 36 yieldable in the direction perpendicular to the magnetic disk 12, this lower flexure seat will absorb the shock of the collision of the head assemblies 26 and 28 via the magnetic disk.

The magnetic disk 12 may be set into rotation by the disk drive mechanism 16, and the pair of transducer head assemblies 26 and 28 may be fed radially of the disk by the head transport mechanism 30, for the transfer of data between the disk and the head assemblies. Little or no resonant vibrations of the head assemblies 26 and 28 will take place during the process of such data transfer because the lower flexure seat 36, although fabricated of a material having a low modulus of elasticity, supports the lower head assembly 26 in a nongimbal fashion, and because the upper flexure seat 46, although a gimbal configuration, is made of a material having a high modulus of elasticity.

Although we have shown and described our invention in terms of but one embodiment thereof, we recognize, of course, that this embodiment is susceptible to a variety of modifications or alterations within the scope of our invention. For example, in the illustrated apparatus 10 for use with the double sided magnetic disk 12, it is required that the coil or coils of only either of the two transducer head assemblies 26 and 28 be arrnaged as above specified. It will therefore be seen that our invention is adaptable for a data transfer apparatus having but one transducer head assembly for use with a single sided recording medium. Further the improved coil arrangement of our invention is not limited by the exact configurations of the flexure seats on the head assemblies are mounted; therefore, for instance, the lower flexure seat 36 could be of gimbal configuration, and the upper flexure seat 46 could be fabricated from beryllium copper. Still further the data transfer apparatus of our invention lends itself to ready adaptation for use with a variety of recording media other than the disk cartridge D employed in the illustrated embodiment. An example of such additional recording media is the well known 3.5 inch floppy disk having a metal made hub to be mounted on a motor driven turntable having a permanent magnet for attracting the disk hub.

We claim:

1. An apparatus for data transfer with a magnetic recording medium, comprising:
   (a) a drive mechanism for imparting rotation to the recording medium in a preassigned data transfer position;
   (b) carriage means movable radially of the recording medium being held in the data transfer position;
   (c) a substantially planar flexure seat made of a resilient, electromagnetically shielding material and comprising a central portion and a marginal edge portion which was resiliently coupled to each other, the flexure seat having the marginal edge portion thereof secured to the carriage means so as to be generally in parallel spaced relation to the recording medium being held in the data transfer position at least during data transfer; and
   (d) a magnetic transducer head assembly mounted on the central portion of the flexure seat and generally disposed on the side of the flexure seat facing the recording medium for data transfer therewith, the head assembly comprising a data transfer core of magnetic material secured to the flexure seat, a data transfer coil mounted to the data transfer core, a pair of outriggers of nonmagnetic material secured to the opposite sides of the data transfer core, and a pair of spacer portions of nonmagnetic material formed integral with the pair of outriggers, respectively, and held against the flexure seat for providing spaces for accommodating the data transfer coil between the outriggers and the flexure seat.

2. The data transfer apparatus of claim 1 wherein the data transfer coil of the magnetic transducer head assembly is wholly disposed on that side of the flexure seat which is directed toward the recording medium being held in the data transfer position.

3. The data transfer apparatus of claim 1 wherein the magnetic transducer head assembly further comprises:
   (a) a pair of tunnel erase cores firmly mounted on opposite sides of the data transfer core; and
   (b) a common erase coil mounted to the tunnel erase cores and disposed at least in part on that side of the flexure seat which is directed toward the recording medium being held in the data transfer position.

4. The data transfer apparatus of claim 1 wherein the metal is a copper base alloy.

5. The data transfer apparatus of claim 4 wherein the copper base alloy is beryllium copper.

6. An apparatus for data transfer with both sides of a magnetic recording medium, comprising:
   (a) a drive mechanism for imparting rotation to the recording medium in a preassigned data transfer position;
   (b) a carriage movable radially of the recording medium being held in the data transfer position;
   (c) a first substantially planar flexure seat made of a resilient, electromagnetically shielding material and comprising a central portion and a marginal edge portion which are resiliently coupled to each other, the first flexure seat having the marginal edge portion thereof secured to the carriage so as to be generally in parallel spaced relation to the recording medium being held in the data transfer position;
   (d) a first magnetic transducer head assembly mounted on the central portion of the first flexure seat and generally disposed on the side of the first flexure seat facing the recording medium for data transfer with one side thereof, the first head assembly comprising a first data transfer core of magnetic material secured to the first flexure seat, a first data transfer coil mounted to the first data transfer core, a first pair of outriggers of nonmagnetic material secured to the opposite sides of the first data transfer core, and a first pair of spacer portions of nonmagnetic material formed integral with the first pair of outriggers, respectively, and held against the first flexure seat for providing spaces for accommodating the first data transfer coil between the first pair of outriggers and the first flexure seat;
   (e) a first electromagnetic shield mounted to the carriage and disposed on that side of the first flexure seat which is away from the recording medium being held in the data transfer position;
   (f) a load arm mounted on the carriage for pivotal motion toward and away from the recording medium in the data transfer position;
   (g) a second substantially planar flexure seat made of a resilient material and peripherally supported by the load arm so as to be substantially in parallel spaced relation to the recording medium when the load arm is pivoted to a predetermined position toward the recording medium;
   (h) a second magnetic transducer head assembly mounted centrally on the second flexure seat and generally disposed on the side of the second flexure seat facing the recording medium for data transfer with the other side thereof, the second head assembly comprising a second data transfer core of magnetic material secured to the second flexure seat, a second data transfer coil mounted to the second data transfer core a second pair of outriggers of nonmagnetic material secured to the opposite sides of the second data transfer core, and a second pair of spacer portions of nonmagnetic material formed integral with the second pair of outriggers, respectively, and held against the second flexure seat for providing spaces for accommodating the second data transfer coil between the second pair of outriggers and the second flexure seat; and
   (i) a second electromagnetic shield mounted to the load arm and disposed on that side of the second flexure seat which is away from the recording medium being held in the data transfer position;
   (j) whereby the coils of the first and second head assemblies are each dually shielding electromagnetically.

7. The data transfer apparatus of claim 6 wherein the second flexure seat is made of a material having a higher modulus of elasticity than the material of the first flexure seat.

* * * * *

UNITED STATES PATENT AND TRADEMARK OFFICE
CERTIFICATE OF CORRECTION

PATENT NO. : 4,811,140

DATED : March 7, 1989

INVENTOR(S) : Katsuya Enami et al

It is certified that error appears in the above-identified patent and that said Letters Patent is hereby corrected as shown below:

Col. 2, line 29, "theretofore" should be --heretofore--.

Col. 3, line 17, after "disk" insert --12--.

Col. 6, line 19, "allow" should be --allows--.

Col. 8, line 9, "48" should be --28--;

line 61, "arrnaged" should be corrected to --arranged--.

Signed and Sealed this

Twelfth Day of September, 1989

Attest:

DONALD J. QUIGG

Attesting Officer

Commissioner of Patents and Trademarks